United States Patent
Ham et al.

(10) Patent No.: US 8,023,084 B2
(45) Date of Patent: Sep. 20, 2011

(54) IN-PLANE SWITCHING MODE LCD AND MANUFACTURING METHOD THEREOF

(75) Inventors: Yong Sung Ham, Anyang-si (KR); Su Hyun Park, Anyang-si (KR)

(73) Assignee: LG Display Co., Ltd., Seoul (KR)

( * ) Notice: Subject to any disclaimer, the term of this patent is extended or adjusted under 35 U.S.C. 154(b) by 825 days.

(21) Appl. No.: 11/166,092

(22) Filed: Jun. 27, 2005

(65) Prior Publication Data
US 2006/0044503 A1    Mar. 2, 2006

(30) Foreign Application Priority Data

Sep. 2, 2004 (KR) .......................... 10-2004-0069793

(51) Int. Cl.
*G02F 1/1337* (2006.01)
(52) U.S. Cl. ........................................ 349/126; 349/123
(58) Field of Classification Search .................. 349/141, 349/123–126
See application file for complete search history.

(56) References Cited

U.S. PATENT DOCUMENTS

| | | | | |
|---|---|---|---|---|
| 6,184,959 B1 * | 2/2001 | Izumi | ............................ | 349/124 |
| 6,583,840 B1 * | 6/2003 | Inoue et al. | .................... | 349/141 |
| 7,327,424 B2 * | 2/2008 | Shimoshikiryoh | ........... | 349/118 |
| 2001/0043300 A1 * | 11/2001 | Nakano | ......................... | 349/129 |
| 2002/0047976 A1 | 4/2002 | Lee et al. | | |
| 2004/0057005 A1 * | 3/2004 | Matsumoto et al. | ........... | 349/141 |
| 2004/0136066 A1 * | 7/2004 | Kashima | ....................... | 359/483 |

FOREIGN PATENT DOCUMENTS

| | | |
|---|---|---|
| JP | 11-305256 | 11/1999 |
| JP | 2001-296528 | 10/2001 |
| JP | 2003-021825 | 1/2003 |
| JP | 2003-156745 | 5/2003 |
| JP | 2003-315827 | 11/2003 |
| KR | 2002-0017047 A | 3/2002 |

* cited by examiner

*Primary Examiner* — Nathanael R Briggs
(74) *Attorney, Agent, or Firm* — McKenna Long & Aldridge LLP

(57) ABSTRACT

An in-plane switching mode liquid crystal display device is provided that prevents light leakages and improves contrast ratio. The in-plane switching mode liquid crystal display device includes first and second substrate, gate and data lines that perpendicularly cross each other on the first substrate to define a pixel region, a thin film transistor at a crossing of the gate and data lines, a pixel electrode and a common electrode alternately formed in the pixel region and spaced apart from each other by a predetermined distance, an alignment layer on an entire surface of the substrate, wherein, at least one of the gate line, the data line, the pixel electrode, and the common electrode has a stepped portion with a step difference of about 0.1 μm or greater, the alignment layer is primarily aligned, and at least a portion of the primarily-aligned alignment layer around the stepped portion is secondarily aligned, and a liquid crystal layer between the first and second substrates.

4 Claims, 18 Drawing Sheets

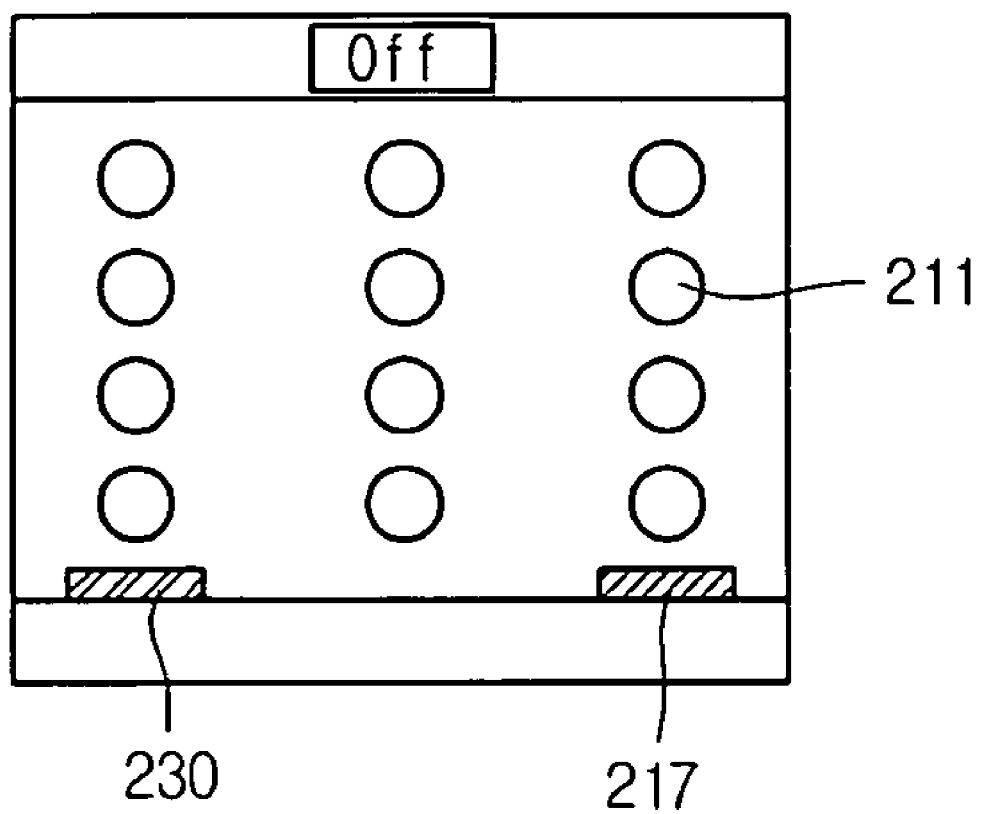

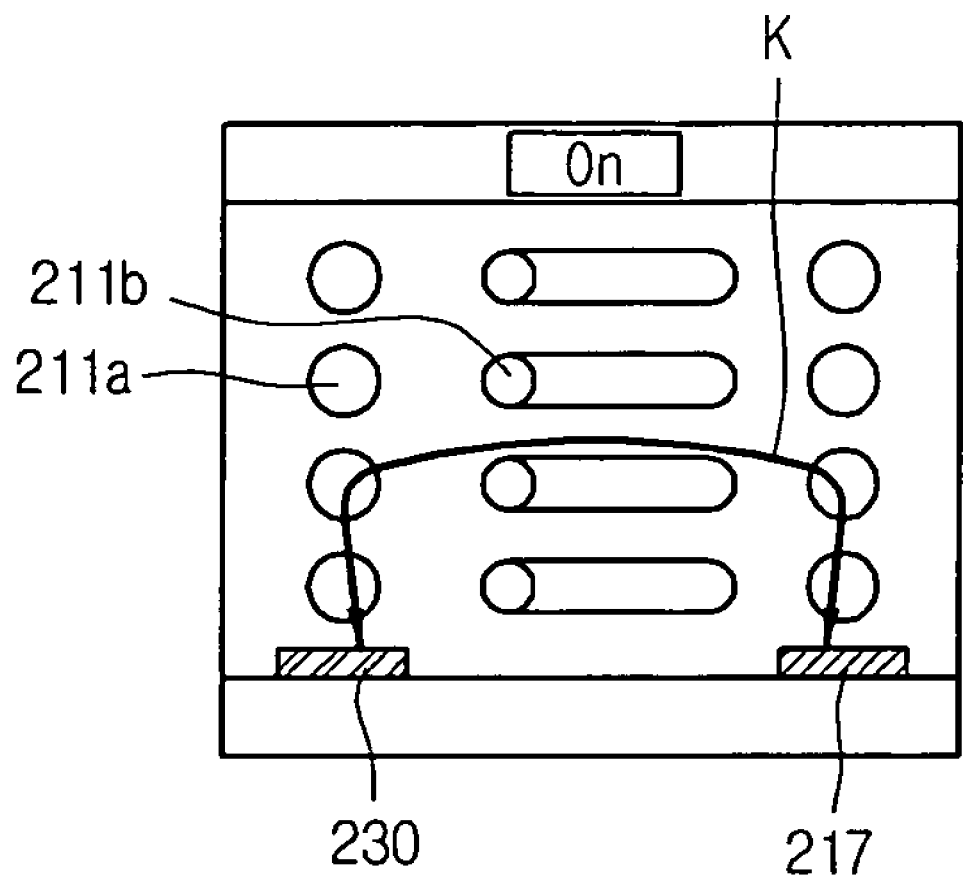

IN-PLANE SWITCHING MODE LCD AND MANUFACTURING METHOD THEREOF

This application claims the benefit of Korean Patent Application No. 2004-69793, filed Sep. 2, 2004, which is hereby incorporated by reference for all purposes as is fully set forth herein.

BACKGROUND OF THE INVENTION

1. Field of the Invention

The present invention relates to an in-plane switching (IPS) mode liquid crystal display device (LCD). More particularly, the present inventor relates to an IPS mode LCD providing an improved image quality and a manufacturing method thereof.

2. Description of the Related Art

The cathode ray tube (CRT) has been the most widely used among display devices to display image information on a screen. However, the CRT has many inconveniences due to its large volume and weight compared with the display area.

With the development of electronic industries, the display device whose usage was limited to a TV Braun tube and so forth, is being used and expanded to, for example, personal computers, notebook computers, wireless terminals, vehicle instrument panels, and electronic display boards. Also, due to the development of information communication technology, since it is possible to transmit large capacity image information, the importance of a next generation display device capable of processing and displaying the large capacity image information gradually increases.

Such next generation display devices are required to have lighter, thinner, shorter and smaller characteristics, a high luminance, a large-sized screen, low power consumption and a low price. Among such next generation display devices, a liquid crystal display device (LCD) is in the limelight.

The LCD exhibits a better resolution than other flat displays, and a fast response rate compared to that of the CRT in implementing a moving picture.

One LCD that has been widely used is a twisted nematic (TN) mode LCD. In the TN mode type LCD, after electrodes are respectively formed on two substrates and liquid crystal directors are aligned twisted by 90°, a driving voltage is applied to the electrodes to drive the liquid crystal directors.

However, the TN mode LCD has a serious drawback of a narrow viewing angle.

Recently, LCDs employing a new mode are being actively researched so as to solve the drawback of the narrow viewing angle of the TN mode. As examples of the new mode, there are an in-plane switching (IPS) mode, an optically compensated birefringence (OCB) mode, etc.

The IPS mode LCD generates a horizontal electric field so as to drive the liquid crystal molecules in a horizontal state with respect to the substrates by forming two electrodes on an identical substrate and applying a voltage between the two electrodes. In other words, the longer axis of the liquid crystal molecule does not stand up with respect to the substrates.

To this end, the IPS mode LCD has a small variation in the birefringence of liquid crystal according to a visual direction and thus has an excellent viewing angle characteristic compared with the TN mode LCD.

Hereinafter, a related art IPS mode LCD will be described in detail with reference to the accompanying drawings.

FIG. 1 is a sectional view of a related art IPS mode LCD.

In FIG. 1, the related art IPS mode LCD is formed by attaching a first substrate 118 and a second substrate 119 facing the first substrate 118, and interposing a liquid crystal layer 130 therebetween. A metal film is first deposited on the first substrate 118 and is patterned to form a plurality of gate lines and a plurality of gate electrodes 109 branched from the respective gate lines and formed at a thin film transistor (TFT) region.

Next, a gate insulating layer 120 is formed on an entire surface of the first substrate including the gate electrode 109, and then a semiconductor layer 115 having an active layer 115a and an ohmic contact layer 115b is formed on a predetermined region of the gate insulating layer 120.

On the gate insulating layer 120, a data line 110 forming a matrix configuration together with the gate line is formed.

In the course of forming the data line 110, source/drain electrodes 116 and 117 of a TFT are formed along with the data line 110.

Also, a common line and a common electrode 113 are formed to be parallel with the gate line 110.

On the entire surface of the first substrate 118 constructed as above, a passivation film 128 is formed.

Thereafter, a pixel electrode 114 is formed to be electrically connected with the drain electrode 117 and be parallel to the data line 110.

On the entire surface of the first substrate 118 constructed as above, a first alignment [orientation] film 129 is formed.

On the other hand, on the second substrate 119, a black matrix 121 for preventing a light from being leaked is formed. A color filter layer consisting of color patterns of red (R), green (G), and blue (B) is formed between the black matrixes 121.

On the color filter layer 122, an overcoat layer 123 for planarizing an upper surface thereof and protecting the underlying color filter layer 122 is formed.

Next, a second alignment film 126 is formed on the overcoat layer 123.

FIGS. 2A and 2B are sectional views illustrating operation states of a related art IPS mode LCD in on/off states.

FIG. 2A illustrates an alignment state of liquid crystal in a liquid crystal layer 211 when no voltage is applied between a common electrode 217 and a pixel electrode 230. In FIG. 2A, since no horizontal electric field is formed, the alignment state of the liquid crystal is not changed.

FIG. 2B illustrates an alignment state of the liquid crystal in the liquid crystal layer 211 when a voltage is applied between the common electrode 217 and the pixel electrode 230. In FIG. 2B, an alignment state of liquid crystal 211a over the common and pixel electrodes 217 and 230 is not changed. On the contrary, since a horizontal electric field K is formed, liquid crystal 211b in a region between the common and pixel electrodes 217 and 230 is aligned in the same direction as the horizontal electric filed K.

That is, the IPS mode LCD has a wider viewing angle due to the horizontally-aligned liquid crystal.

FIG. 3 is a flow diagram illustrating a manufacturing method for a related art IPS mode LCD.

In FIG. 3, upper and lower substrates having a plurality of patterns formed thereon are first manufactured in S100.

In S110, the substrates are cleaned to remove any foreign substance thereon. In S120, a polyimide material is printed on the substrate to form an alignment layer.

In S130, the alignment layer is dried and hardened using the heat of high temperature.

In S140, a surface of the hardened alignment layer is rubbed in one direction.

In S150, an adhesive seal pattern is formed at an edge of the upper substrate at a region except a liquid crystal injection hole and spacers are dispersed on the lower substrate.

In S160, the upper and lower substrates are attached together with an accuracy of several μm so as to prevent light leakage.

In S170, the attached substrate is cut into cells. This cutting process includes a scribing process for forming lines on the upper and lower substrates and a breaking process for dividing the scribed substrate into cells by applying an impact thereon.

In S180, liquid crystal is injected through an injection hole into a gap between the upper and lower substrates cut into cells. The injection hole is sealed to complete a desired LCD.

Here, the physical characteristic of the liquid crystal is changed by a molecular arrangement state thereof, and accordingly there occurs a difference in a response to an external force such as an electric field.

Due to the characteristics of the liquid crystal molecule, a control technique for an arrangement state of the liquid crystal molecule is essential for the study on the physical property of the liquid crystal and the construction of the LCD.

Specifically, a rubbing process for uniformly aligning liquid crystal molecules in one direction is essential for a normal driving of the LCD and a uniform display characteristic thereof.

A related art alignment layer forming process for determining an initial alignment direction of liquid crystal molecules will now be described in detail.

The forming of an alignment layer includes a process of depositing a high polymer thin layer and a process of aligning an alignment layer in one direction.

The alignment layer is made mainly of an organic material of polyimide series and is aligned mainly through a rubbing process.

An organic material of polyimide series is deposited on a substrate and a solvent thereof is volatized at about 60~80° C. Thereafter, the deposited material is hardened at about 80~200° C. to form an alignment layer. The alignment layer is rubbed in one direction with a roller having a rubbing cloth such as velvet wound therearound to form an alignment direction thereof.

This rubbing process enables an easy and stable alignment process and is thus suitable for mass production of the LCD.

However, the rubbing process may cause a defect in a rubbing operation when the rubbing cloth becomes defective during the rubbing operation.

That is, the rubbing process is performed through a direct contact between the rubbing cloth and the alignment layer. Therefore, the rubbing process may cause the contamination of a liquid crystal cell due to particles, the damage of a TFT due to an electrostatic discharge, the necessity of an additional cleaning process after the rubbing process, and a non-uniform alignment of liquid crystal in a wide-screen LCD, resulting degradation in a production yield of the LCD.

FIGS. 4A and 4B are, respectively, a sectional view and a plan view illustrating an alignment state of liquid crystal around a step portion of an electrode pattern such as a pixel electrode and a common electrode in a related art IPS mode LCD.

In FIGS. 4A and 4B, an alignment layer 351 is formed on a pixel electrode 330 patterned on a lower substrate and the pixel electrode 330 has a stepped portion with a predetermined step difference.

A color filter layer 360 and an alignment layer 352 are formed on an upper substrate facing the lower substrate and a liquid crystal layer 390 is formed between the upper and lower substrates.

The stepped portion of the pixel electrode 330 causes a non-uniform alignment of liquid crystal in a region therearound.

If the liquid crystal is in a normally-black mode, a black color is displayed when no voltage is applied.

However, there light leakage occurs in a region A shown in FIGS. 4A and 4B when no gate voltage is applied.

That is, when no voltage is applied, the liquid crystal must be aligned in the same direction as the rubbing direction of the alignment layers 351 and 352.

However, the stepped portion of the pixel electrode 330 causes the liquid crystal of a non-uniform liquid layer 391 to have an alignment direction different from a rubbing direction and accordingly causes the liquid crystal of a uniform liquid layer 392 also to have an alignment direction different from the rubbing direction.

The non-uniform liquid crystal causes phase retardation in light. The phase retardation causes a linearly-polarized light to change into an elliptically-polarized light. The elliptically-polarized light causes phase retardation in a uniform liquid crystal layer formed near the color filter layer 360, resulting in a great phase retardation.

Consequently, when no voltage is applied in a normally-black mode, light of the backlight assembly passes through the region A. This causes light leakage in a dark state and a decrease in a contrast ratio, making it difficult to embody a high image quality.

Recently, a super IPS mode LCD for improving a viewing angle and an IPS mode LCD using 3~4 masks for reducing the number of manufacturing processes are developed and used. In these IPS mode LCDs, the step difference of the stepped portion is increased to cause an increase in an alignment defect.

Accordingly, there is required a device and method for preventing an increase in a black brightness and a contrast ratio due to the stepped portion.

SUMMARY OF THE INVENTION

Accordingly, the present invention is directed to an IPS mode LCD a manufacturing method thereof that substantially obviates one or more problems due to limitations and disadvantages of the related art.

An advantage of the present invention is to provide an IPS mode LCD and a manufacturing method thereof, in which the entire surface of the alignment layer is rubbed and then the rubbed entire surface or a region thereof around the stepped portion of the electrode is irradiated with light or ion beams to thereby reduce light leakage due to the stepped portion.

Additional advantages, and features of the invention will be set forth in part in the description which follows and in part will become apparent to those having ordinary skill in the art upon examination of the following or may be learned from practice of the invention. These and other advantages of the invention may be realized and attained by the structure particularly pointed out in the written description and claims hereof as well as the appended drawings.

To achieve these and other advantages and in accordance with the purpose of the invention, as embodied and broadly described herein, there is provided an in-plane switching mode liquid crystal display device, including: first and second substrates; gate and data lines perpendicularly crossing each other on the first substrate to define a pixel region; a thin film transistor at a crossing of the gate line and the data line; a pixel electrode and a common electrode arranged in an alternating pattern in the pixel region and spaced apart from each other by a predetermined distance; an alignment layer formed on an entire surface of the substrate, wherein at least one of the gate line, the data line, the pixel electrode, and the common electrode have a stepped portion with a step difference of about 0.1 µm or greater, the alignment layer being primarily aligned, and at least a portion of the primarily-aligned alignment layer around the stepped portion being secondarily aligned; and a liquid crystal layer formed between the first and second substrates.

In another aspect of the present invention, there is provided a method for manufacturing an in-plane switching mode liquid crystal display device, including: providing first and second substrates that face each other; horizontally forming gate and common lines spaced apart from each other by a predetermined distance on the first substrate; forming a data line substantially perpendicular to the gate line; forming a plurality of common electrodes substantially parallel to the data line, and a plurality of pixel electrodes alternately crossing the common electrodes; forming a first alignment layer on the first substrate including the pixel electrodes; performing a primary alignment on the first alignment layer using a rubbing process; performing a secondary alignment on the rubbed first alignment layer by irradiating a beam with a predetermined energy thereon, wherein at least one of the gate line, the data line, the pixel electrode, and the common electrode have a stepped portion with a step difference of about 0.1 µm or greater, and wherein the secondary alignment process is performed on at least a portion of the alignment layer around the stepped portion; forming a color filter layer and a black matrix layer on the second substrate; and forming a liquid crystal layer between the first and second substrates.

In another aspect of the present invention, there is provided an in-plane switching mode liquid crystal display device including: first and second substrates; gate and data lines perpendicularly crossing each other on the first substrate to define a pixel region; a thin film transistor at a crossing of the gate line and the data line; a pixel electrode and a common electrode arranged in an alternating pattern in the pixel region and spaced apart from each other by a predetermined distance; an alignment layer on an entire surface of the substrate, wherein at least one of the gate line, the data line, the pixel electrode, and the common electrode have a tapered sidewall with a taper angle of about 50° or greater, wherein the alignment layer being primarily aligned, at least a portion of the primarily-aligned alignment layer around the tapered sidewall being secondarily aligned by irradiating a beam having a predetermined energy; and a liquid crystal layer formed between the first and second substrates.

In still another aspect of the present invention, there is provided a method for manufacturing an in-plane switching mode liquid crystal display device, the method including: providing first and second substrates that face each other; horizontally forming gate and common lines spaced apart from each other by a predetermined distance on the first substrate; forming a data line substantially perpendicular to the gate line; forming a plurality of common electrodes substantially parallel to the data line, and a plurality of pixel electrodes in an alternating pattern with the common electrodes; forming a first alignment layer on the first substrate including the pixel electrodes; performing a primary alignment on an entire surface of the first alignment layer using a rubbing process; performing a secondary alignment on the rubbed first alignment layer by irradiating a beam with a predetermined energy thereon, wherein at least one of the gate line, the data line, the pixel electrode, and the common electrode have a tapered sidewall with a taper angle of about 50° or greater, and wherein the first alignment layer being primarily aligned, at least a portion of the primarily-aligned first alignment layer around the tapered sidewall being secondarily aligned by irradiating a beam with a predetermined energy thereon; forming a color filter layer and a black matrix layer on the second substrate; and forming a liquid crystal layer between the first and second substrates.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

In the drawings:

FIGS. 2A and 2B are sectional views illustrating the operation states of a related art IPS mode LCD in on/off states;

DETAILED DESCRIPTION OF THE ILLUSTRATED EMBODIMENTS

Reference will now be made in detail to embodiments of the present invention, examples of which are illustrated in the accompanying drawings. Wherever possible, the same reference numbers will be used throughout the drawings to refer to the same or like parts.

Figure 1:
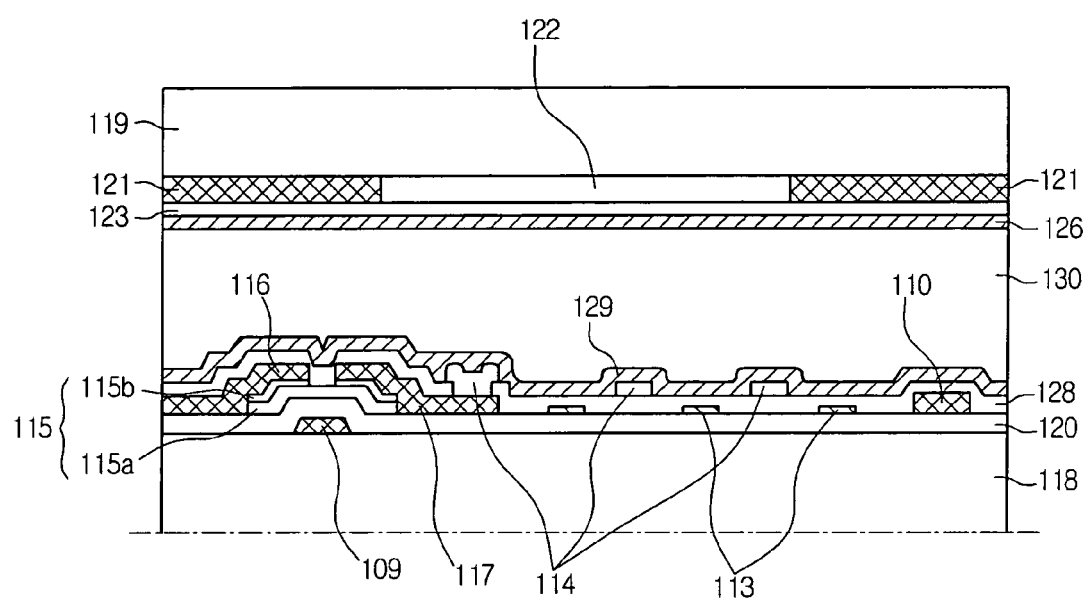
FIG. 1 is a sectional view of a related art IPS mode LCD.
Figure 3:
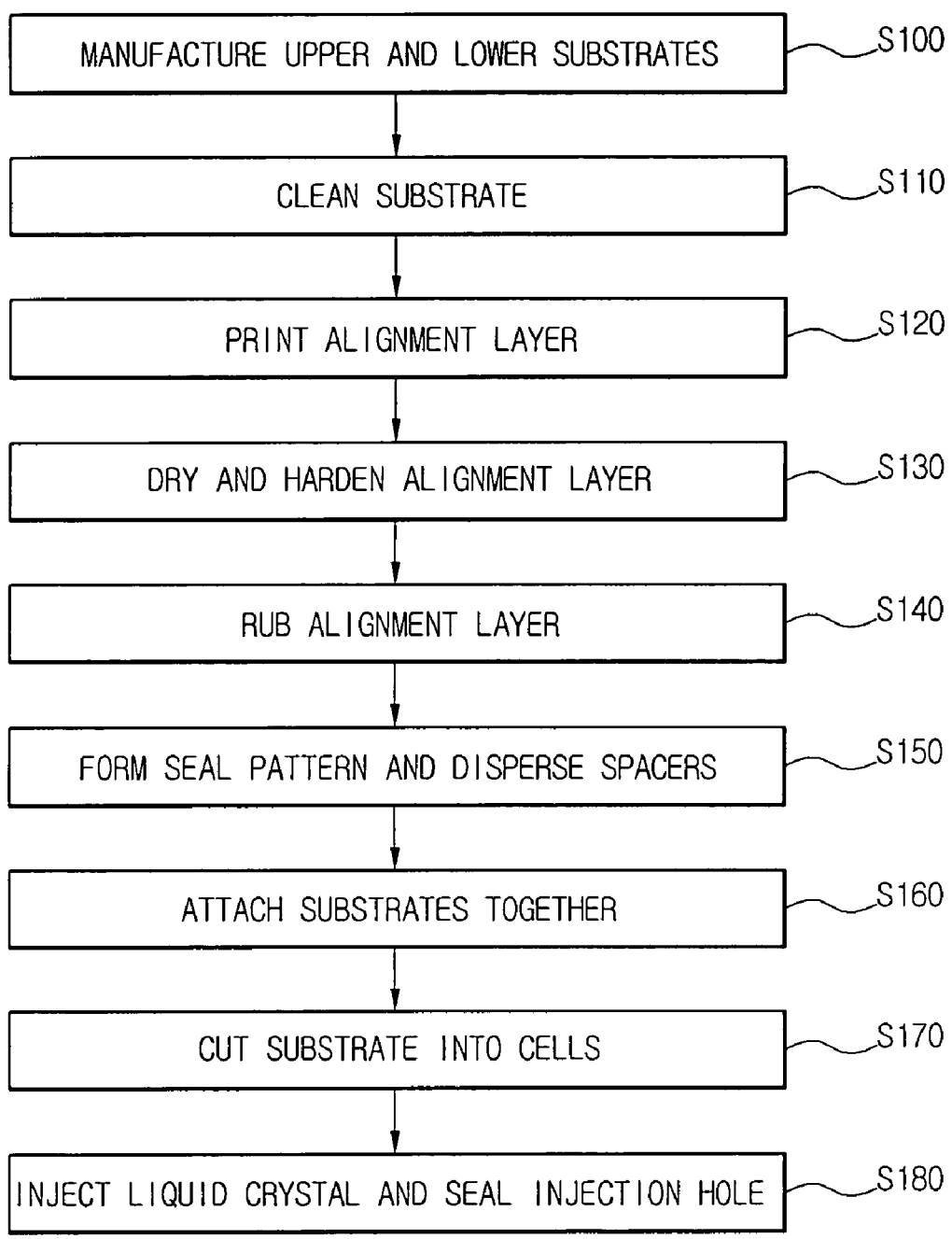
FIG. 3 is a flow diagram illustrating a manufacturing method for a related art IPS mode LCD.
Figure 4A:
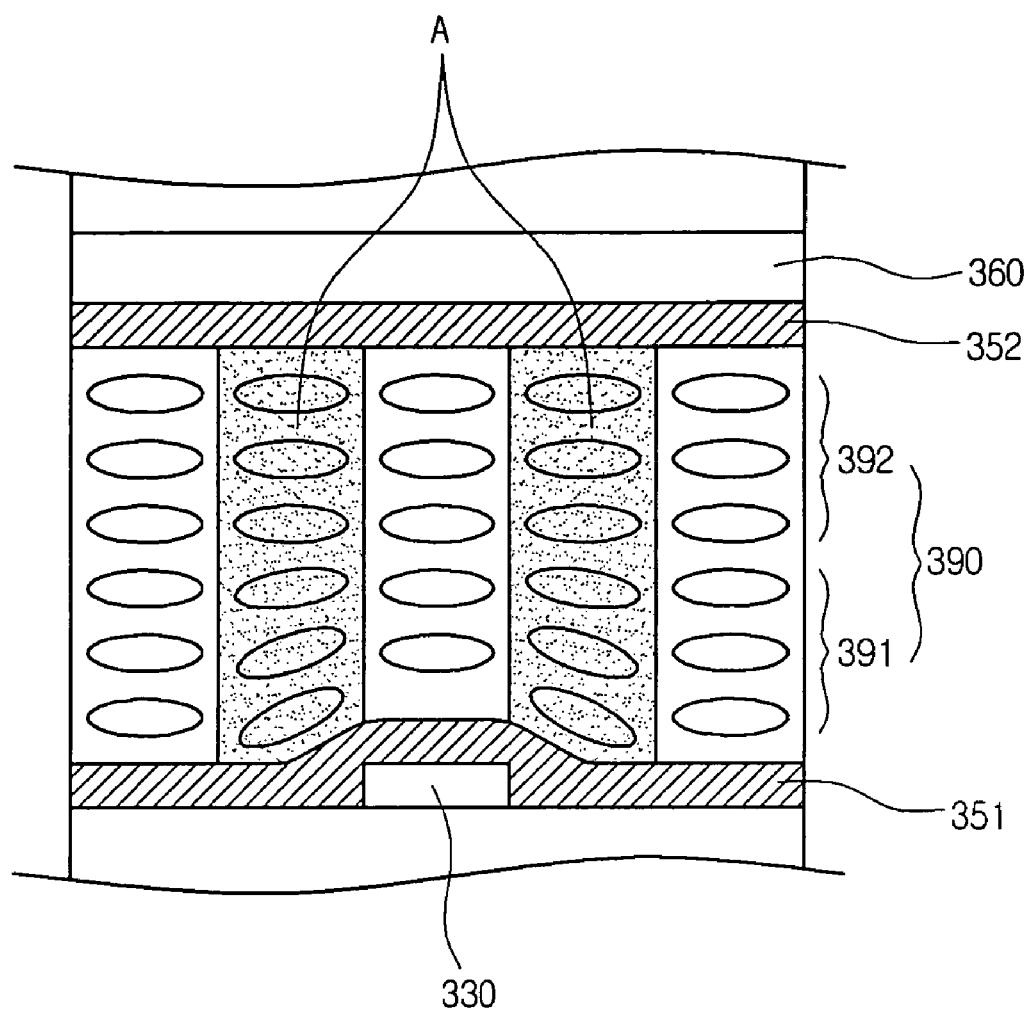
FIGS. 4A and 4B, respectively, a sectional view and a plan view illustrating an alignment state of liquid crystal around a step portion of an electrode in a related art IPS mode LCD.
Figure 4B:
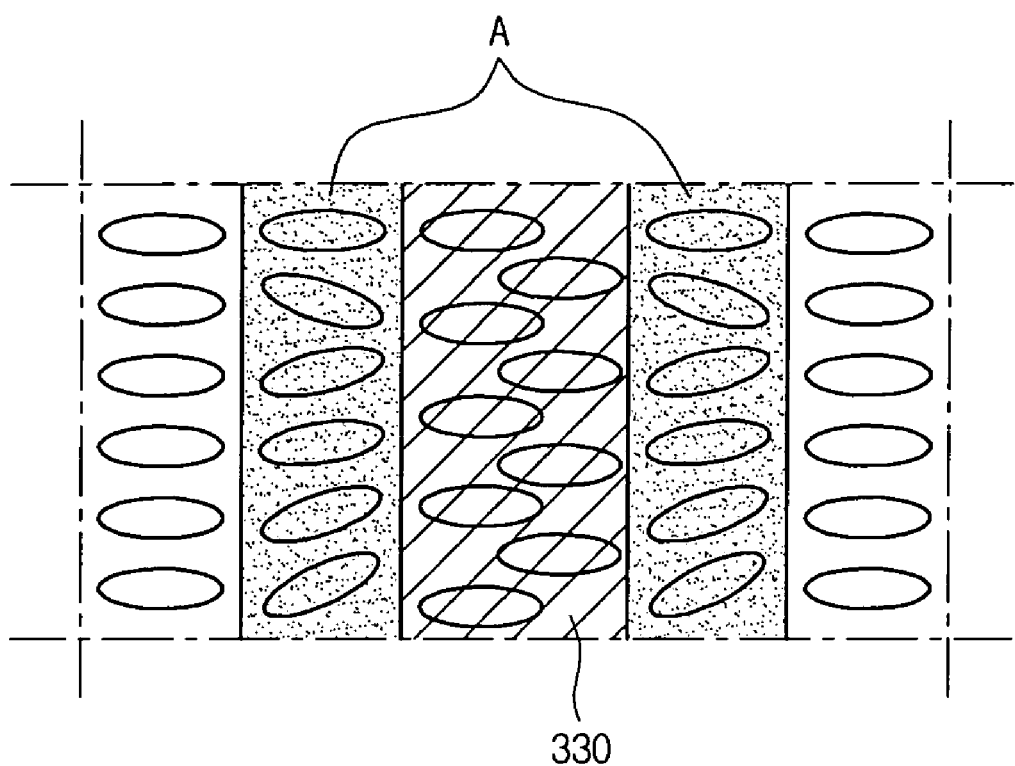
Figure 5:
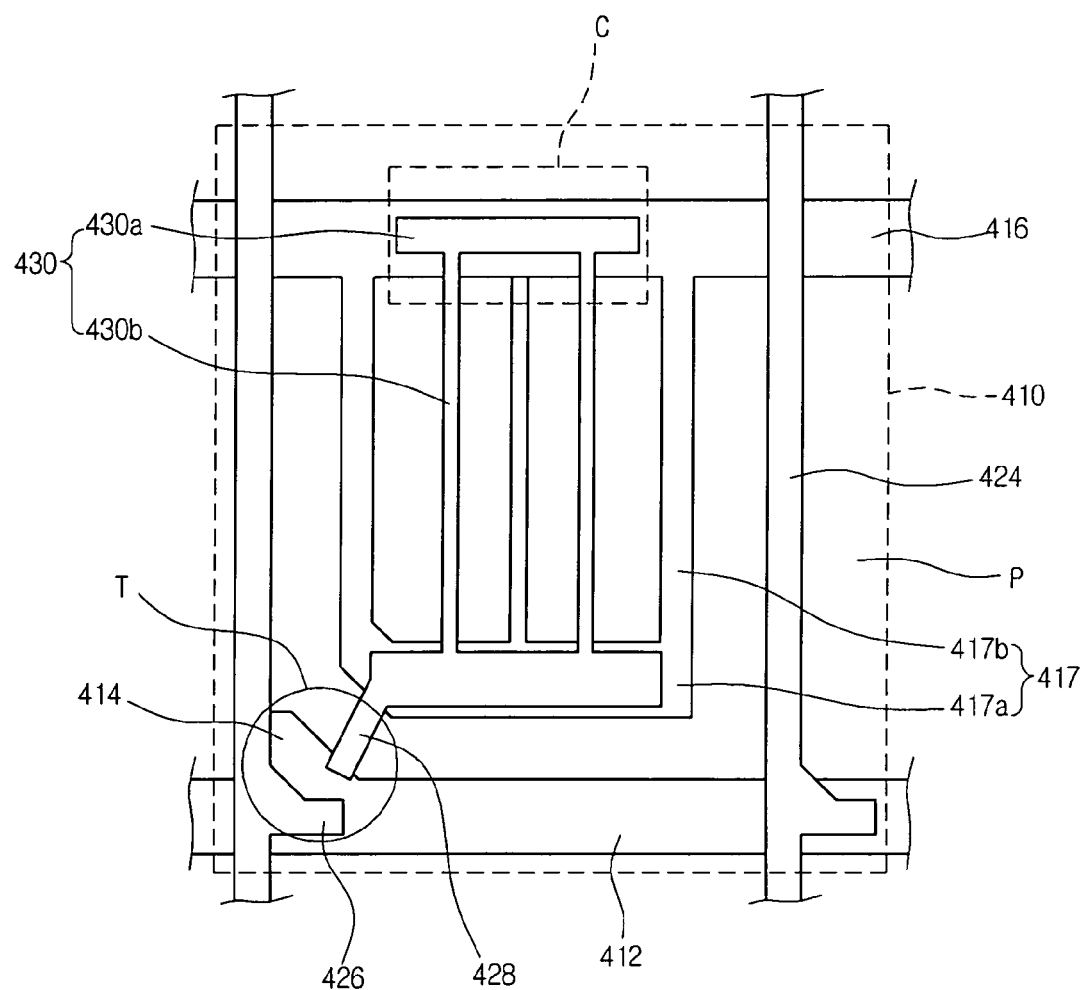
FIG. 5 is a schematic plan view of an array substrate of an IPS mode LCD according to an embodiment of the present invention.

In FIG. 5 is a schematic plan view of an array substrate of an IPS mode LCD according to an embodiment of the present invention.

In FIG. 5, an array substrate 410 of the IPS mode LCD includes: a plurality of gate lines 412 horizontally arranged substantially parallel to each other and spaced apart from each other by a predetermined distance; a plurality of common lines 416 horizontally arranged substantially parallel to each other and closely to the gate lines 412; and a plurality of data lines 424 vertically arranged to cross the gate and common lines 412 and 416 and to be spaced apart from each other by a predetermined interval, thereby defining pixel regions P together with the gate lines 112.

A thin film transistor (TFT) T that includes a gate electrode 414, a semiconductor layer (see 427 in FIG. 6), a source electrode 426, and a drain electrode 428 is formed at a crossing between the gate line 412 and the data line 424. The source electrode 426 is connected to the data line 424 and the gate electrode 414 is connected to the gate line 412.

A pixel electrode 430 connected with the drain electrode 428 and a common electrode 417 arranged substantially parallel to the pixel electrode 430 and connected with the common lines 416 is formed on the pixel region P.

The pixel electrode 430 includes: a plurality of vertical parts 430b extended from the drain electrode 428, formed substantially parallel to the data lines 424, and spaced apart from each other by a predetermined distance; and a horizontal part 430a disposed on the common line 416 to connect the vertical parts 430b.

The common electrode 417 includes: a plurality of vertical parts 417b extended vertically from the common lines 416 and alternately formed substantially parallel to the vertical parts 430b of the pixel electrode 430; and a horizontal part 417a connecting the vertical parts 417b.

The horizontal part 430a of the pixel electrode 430 is formed on a portion of the common line 416 with a gate insulating layer (see 419 in FIG. 6) therebetween and forms a storage capacitor C together with the common line 416.

Here, the data line 424, the pixel electrode 430, and the common electrode 417 may be formed in a zigzag pattern having at least one zigzag portion.

A method for manufacturing the above-structured IPS mode LCD will now be described in detail.

FIGS. 6A to 6E are sectional views illustrating a process of manufacturing an IPS mode LCD according to an embodiment of the present invention.

Figure 6A:
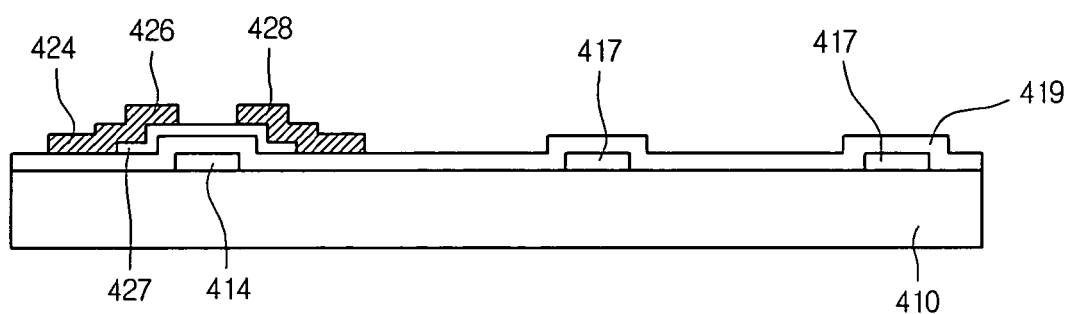
FIGS. 6A to 6E are sectional views illustrating a process of manufacturing an IPS mode LCD according to an embodiment of the present invention.

In FIG. 6A, low-resistance metal for preventing a signal delay is deposited on an array substrate 410 and then patterned through photolithography, to thereby form a gate line (see 412 in FIG. 5) and a gate electrode 414 (of a TFT) branched from the gate line.

Here, the low-resistance metal may be, for example, Cu, Al, an Al alloy (such as an Al—Nd alloy), Mo, Cr, Ti, Ta, or Mo—W alloy.

A common line (416 in FIG. 5) substantially parallel to the gate line 412, and a plurality of common electrodes 417 branched from the common line 416 are simultaneously formed while the gate line 412 and the gate electrode 414 are formed.

Inorganic insulating material such as silicon nitride (SiNx) or silicon oxide (SiOx) is deposited on the whole surface of the array substrate 410 including the gate line 412 using plasma enhanced chemical vapor deposition (PECVD), to thereby form a gate insulating layer 419.

Material such as amorphous silicon is deposited on the gate insulating layer 419 and is selectively removed, to thereby form a semiconductor layer 427 having an island shape.

Although not shown, an ohmic contact layer may also be formed by doping impurity ions into the amorphous silicon and then patterning.

Figure 6B:
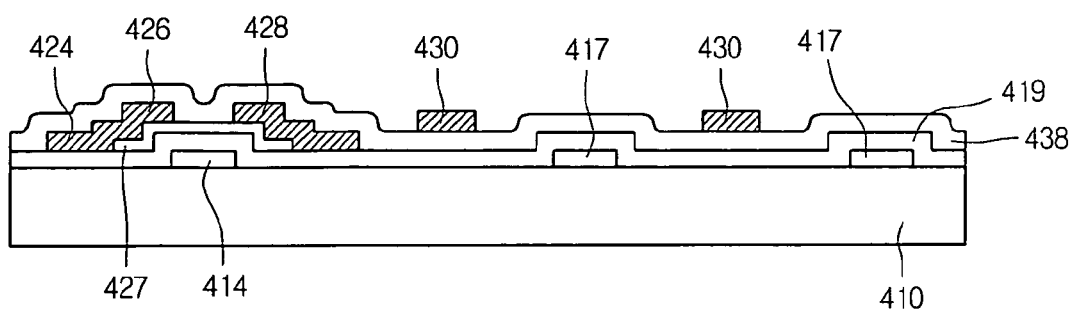

In to FIG. 6B, metal such as Cr, Al, Cu, Mo, Ti, Ta, an Mo—W alloy, an Al alloy, and the like is deposited on the entire upper surface of the gate insulating layer 419 and then the resulting structure is patterned and etched through photolithography, to thereby form a data line 424 perpendicularly crossing the gate line 412 to define a pixel region, and source/drain electrodes 426 and 428 disposed at both ends of the semiconductor layers 427.

A silicon nitride layer or benzocyclobutene (BCB), that is, an organic insulating layer, is deposited on the entire surface of the array substrate 410, to thereby form a passivation layer 438. Thereafter, a contact hole (not shown) is formed at the drain electrode 428.

Thereafter, a transparent conductive layer of an indium tin oxide (ITO) or an indium zinc oxide (IZO) is deposited on the entire surface of the resulting structure and is then patterned, thereby forming a plurality of pixel electrodes 430 that is connected to the drain electrode 428 and is disposed between the common electrodes 417 and substantially parallel to the data line 424.

Although not shown in the drawings, when formed of metal material, the pixel electrode 430 may be formed of the same material as the data line 424, along with the data line 424, before the passivation layer 438 is formed.

Figure 6C:
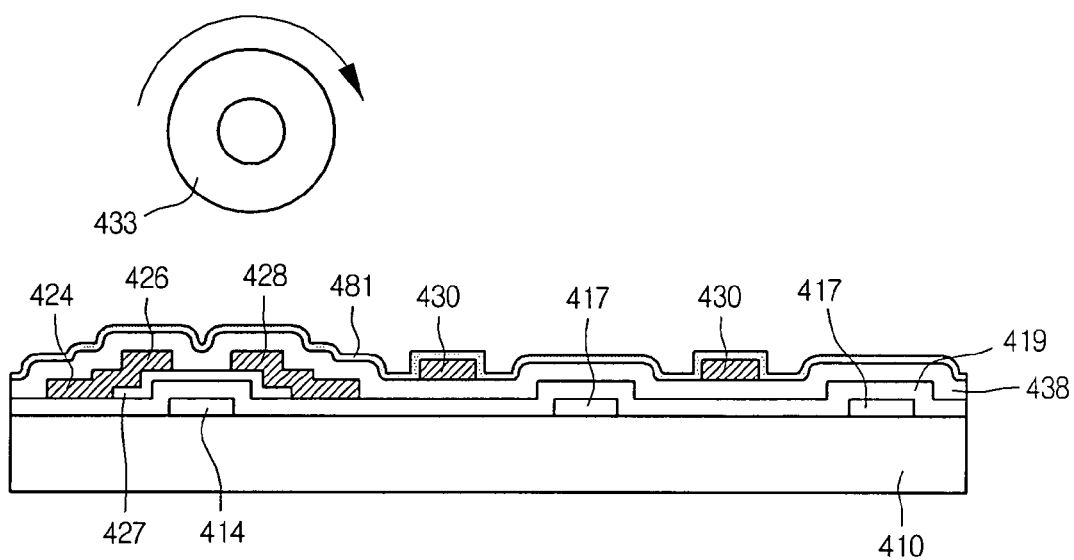

In FIG. 6C, a polyimide resin having an excellent heat resistance and an excellent affinity with liquid crystal is printed on the entire surface of the resulting structure including the pixel electrodes 430 and is then dried to form a first alignment layer 481. The first alignment layer 481 is primarily aligned through a rubbing process.

The alignment layer 481 may be formed of a high polymer material whose molecular bondage is partially broken when UV rays are irradiated thereto, such as polyamic acid, polyethyleneimine, polyvinyl alcohol, polyamide, polyethylene, polystylene, polyphenylenephthalamide, polyester, polyurethanes, polymethylmethacrylate, as well as of a polyimide resin.

In the primary alignment process, the first alignment layer 481 is rubbed in one direction using a rubbing roller 433 having a rubbing cloth (such as velvet, rayon or nylon) wound therearound, to thereby form an alignment direction.

Figure 6D:
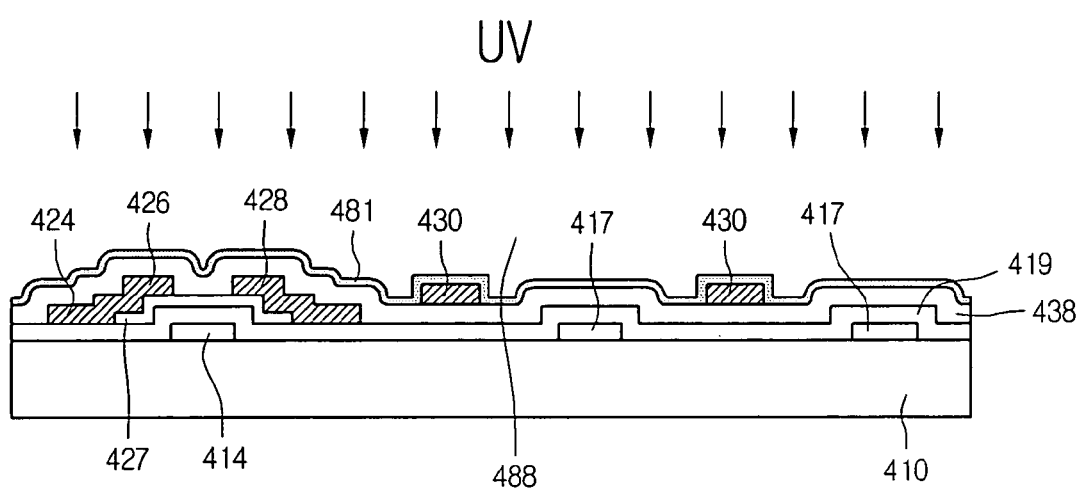

In FIG. 6D, the primarily-aligned first alignment layer 481 is secondarily aligned by the irradiation of light or ion beams.

Here, the light may be a linearly polarized light, a partially polarized light, or a non-polarized light.

The wavelength of the light may have a wavelength band of about 200~400 nm and the energy thereof may be about 0.01~10 J.

The light may be irradiated in a slanted or vertical direction.

The ion beams may be made of argon ions.

A device for irradiating the light or the ion beams may be an irradiation device that irradiates light or ion beams on the entire surface of the substrate, or may be a scan type device.

Meanwhile, the primary alignment process may be performed through the irradiation of light or ion beams, and the secondary alignment process may be performed through the rubbing process.

Also, the primary and secondary alignment processes may be simultaneously performed.

The rubbing direction is identical to the light alignment direction. This aims at maximizing the alignment improvement effect.

The second alignment process causes a uniform alignment in a region around a stepped portion of an electrode.

Figure 6E:
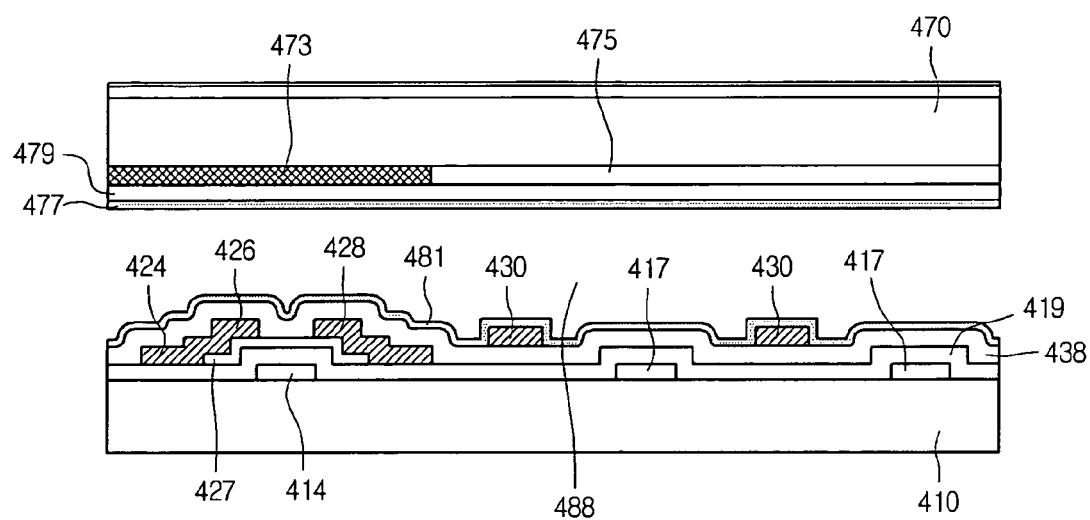

In FIG. 6E, a black matrix layer 473 is formed of a black resin or a high reflective metal such as Cr or chrome oxide on a color filter substrate 470 so as to prevent a light leakage at a gate line, a data line, or a thin film transistor where liquid crystal is uncontrollable.

An R/G/B color filter layer 475 for reproducing color is formed between the black matrix patterns 473 through electro-deposition, pigment dispersion, or through coating. An overcoat layer 479 may be formed on the color filter layer 475 and the black matrix 473 to protect the color filter layer 475.

A photosensitive polyimide material having an excellent affinity with liquid crystal is printed on the overcoat layer 479 to form a second alignment layer 477. The second alignment layer 477 is formed to have an alignment direction substantially perpendicular to that of the first alignment layer 481. The second alignment layer 477 is formed through the first alignment process and the second alignment process that was described above with respect to the first alignment layer 481.

A column spacer (not shown) is formed at the array substrate 410 or the color filter substrate 470, and then a liquid crystal layer 488 is formed in a display region of the array substrate 410 or the color filter substrate 470 using one of an injection method or a dispensing method. Thereafter, a sealant is formed on an edge of the array substrate 410 and the color filter substrate 470, and then the array substrate 410 and the color filter substrate 470 are attached together in a vacuum state.

Figure 7A:
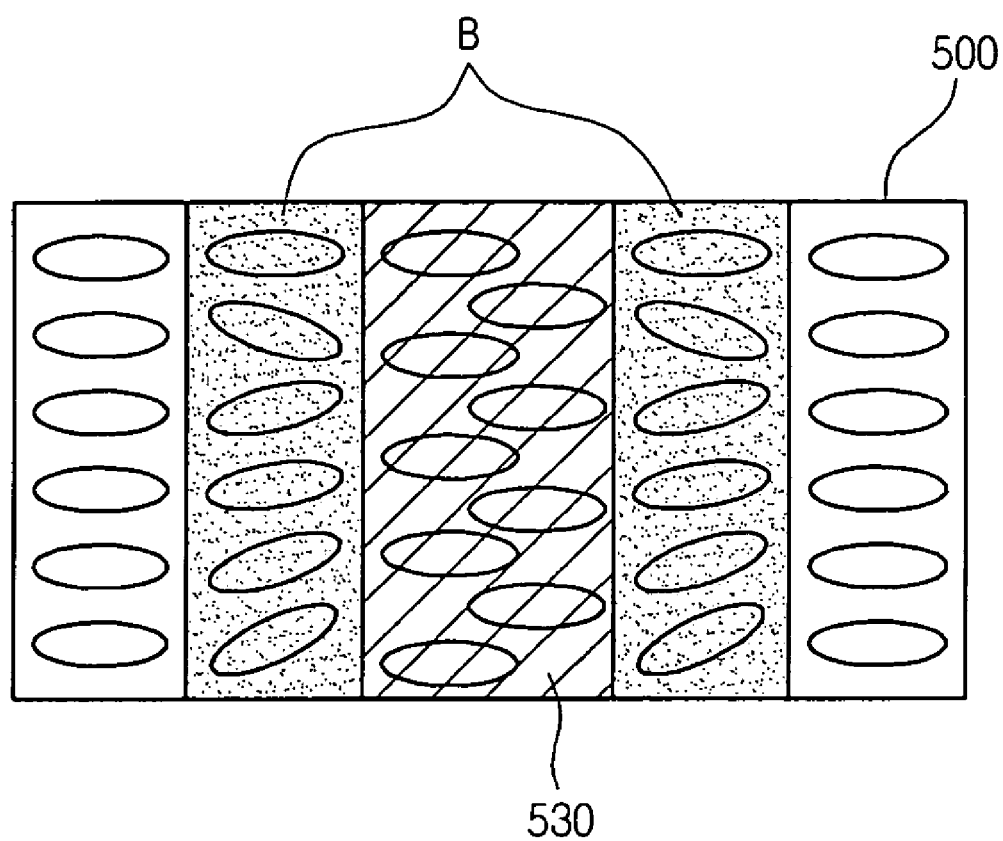
FIGS. 7A and 7B are plan views illustrating an alignment of liquid crystal in an electrode region of an IPS mode LCD according to an embodiment of the present invention.
Figure 7B:
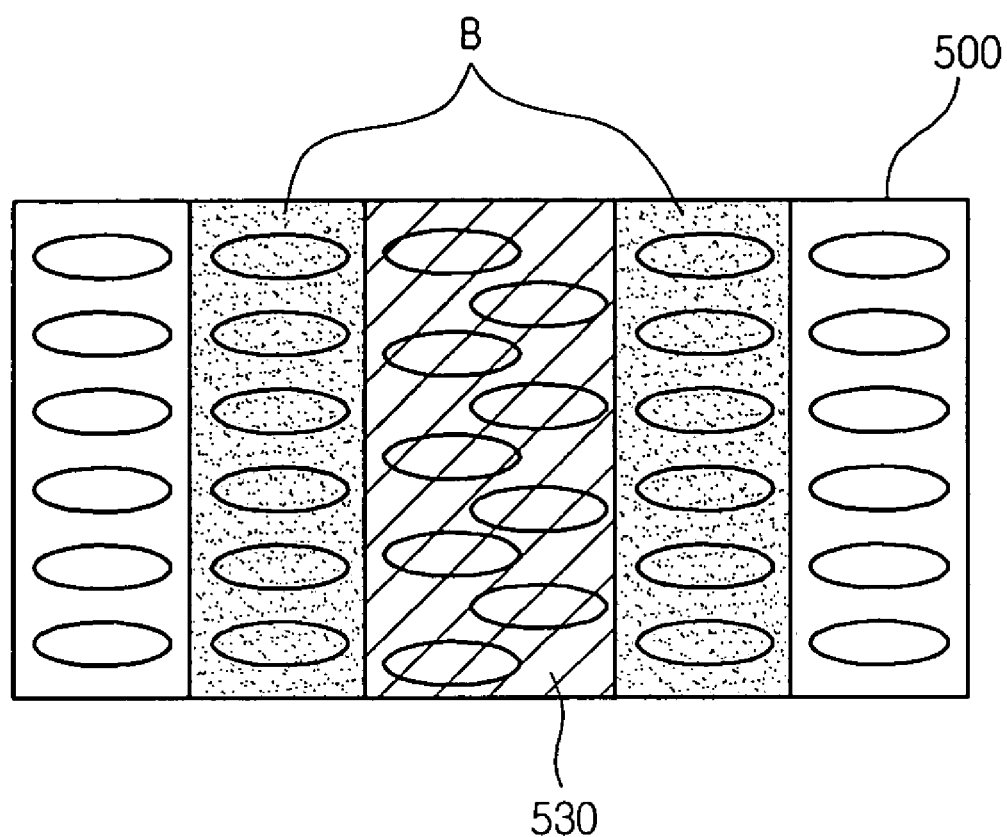

FIGS. 7A and 7B are plan views illustrating an alignment of liquid crystal in an electrode region of an IPS mode LCD according to an embodiment of the present invention.

In FIGS. 7A and 7B, an alignment layer is formed on a substrate 500 including an electrode having a stepped portion.

The stepped portion has a step difference of 0.1 μm or greater.

When the step difference is 0.1 μm or greater and the alignment layer is rubbed, there may occur a non-uniform alignment of liquid crystal around the stepped portion of the electrode.

In FIG. 7A, the alignment layer formed on the substrate 500 is primarily aligned through a rubbing process.

In the primary alignment process, the alignment layer is rubbed in one direction using a rubbing roller having a rubbing cloth (such as velvet, rayon or nylon) wound therearound, to thereby form an alignment direction.

When the alignment layer is rubbed using a rubbing roller having the rubbing cloth, there may occur a non-uniform alignment of liquid crystal in a region B around the stepped portion of the electrode because the rubbing cloth is disheveled or cannot reach the alignment layer due to the stepped portion having a step difference of 0.1 μm or greater.

In FIG. 7B, the primarily-aligned alignment layer is secondarily aligned by the irradiation of light or ion beams.

The second alignment process causes a uniform alignment in a region around a stepped portion of an electrode.

Meanwhile, the primary alignment process may be performed through the irradiation of light or ion beams, and the secondary alignment process may be performed through the rubbing process.

Also, the primary and secondary alignment processes may be simultaneously performed.

The rubbing direction may be identical to the light alignment direction. When the rubbing direction is identical, the alignment improvement effect is maximized.

Also, when the step difference is smaller than 0.1 μm, the primary and secondary alignment processes may be performed to further improve the alignment state of liquid crystal in a region around the stepped portion of the electrode.

Figure 8A:
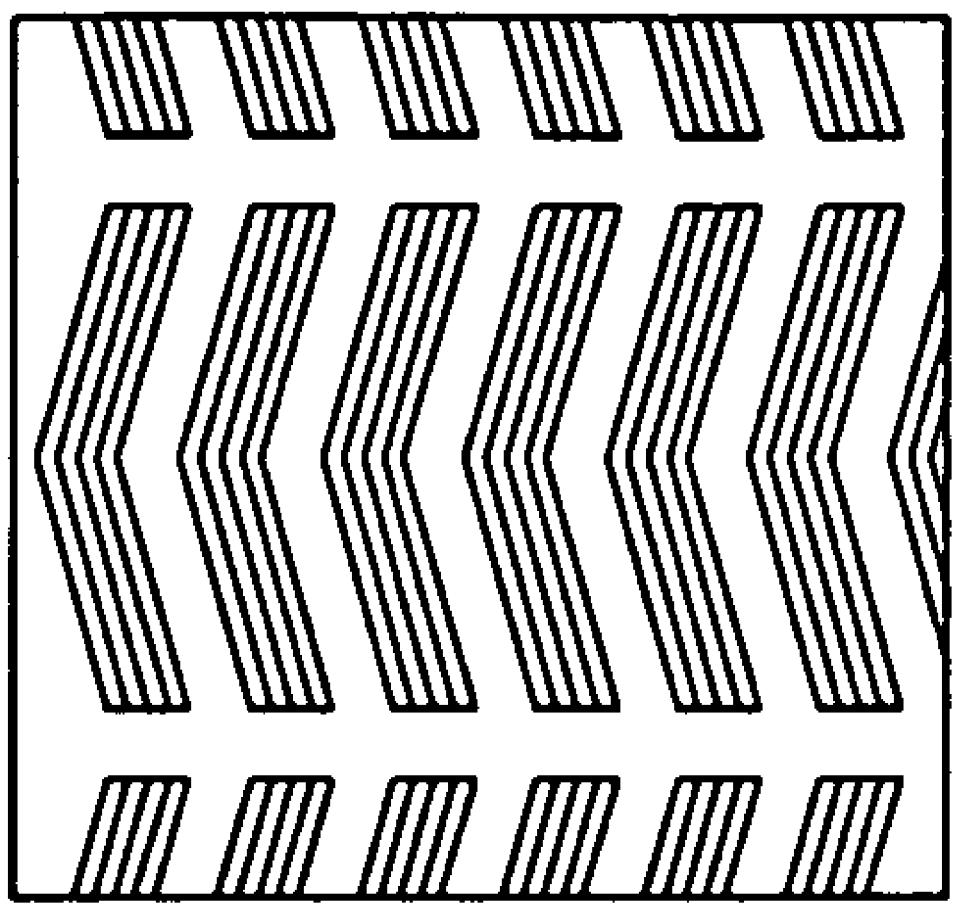
FIG. 8A is a view of an alignment layer that was rubbed in a primary alignment process according to an embodiment of the present invention.
Figure 8B:
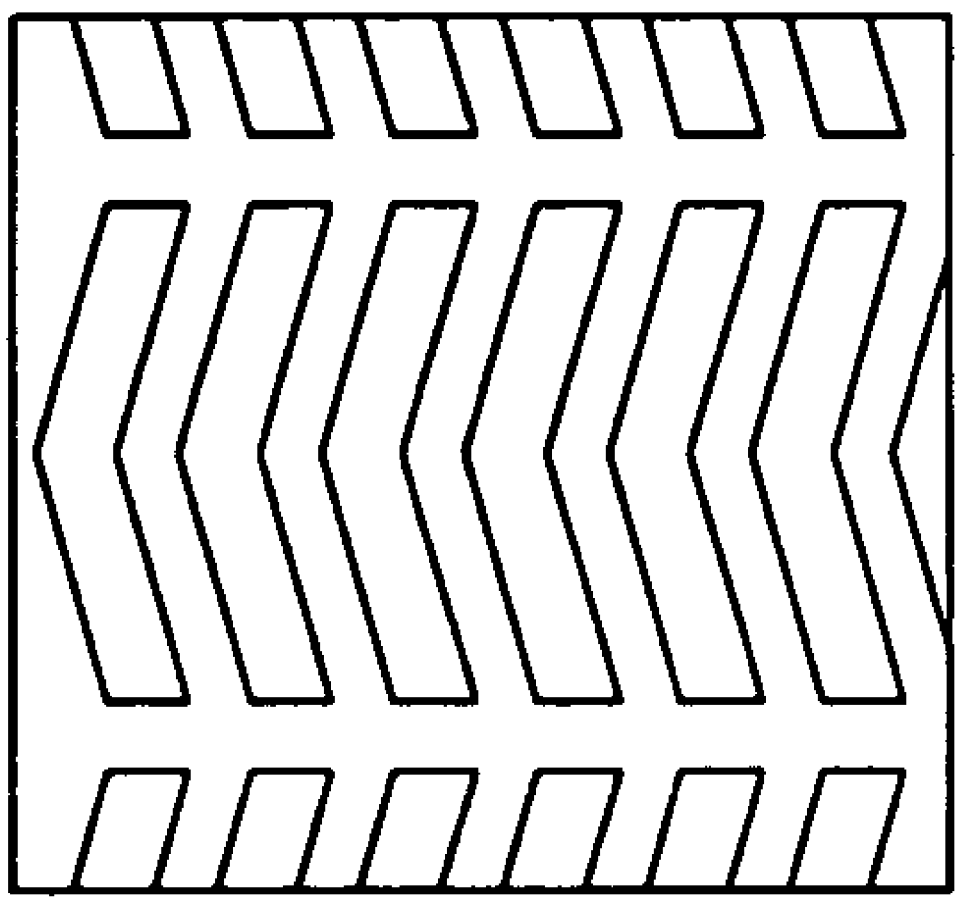
FIG. 8B is a view of an alignment layer that was rubbed in the primary alignment process and was then irradiated with light or ion beams in a secondary alignment process.

FIGS. 8A and 8B illustrate a black brightness at a portion of the IPS mode LCD according to an embodiment of the present invention.

FIG. 8A is a view of the alignment layer that was rubbed in the primary alignment process, and FIG. 8B is a view of the alignment layer that was rubbed in the primary alignment process and then irradiated with light or ion beams in the secondary alignment process.

Here, the stepped portion of the electrode has a step difference of about 0.2 μm.

As shown in FIG. 8A, when the alignment layer is only rubbed in the primary alignment process, there light leakage occurs due to a non-uniform alignment of liquid crystal in a region around the stepped portion of the electrode. On the contrary, as shown in FIG. 8B, when the alignment layer is rubbed and then irradiated with light, there is little light leakage due to a uniform alignment of liquid crystal in the region around the stepped portion of the electrode.

Figure 9A:
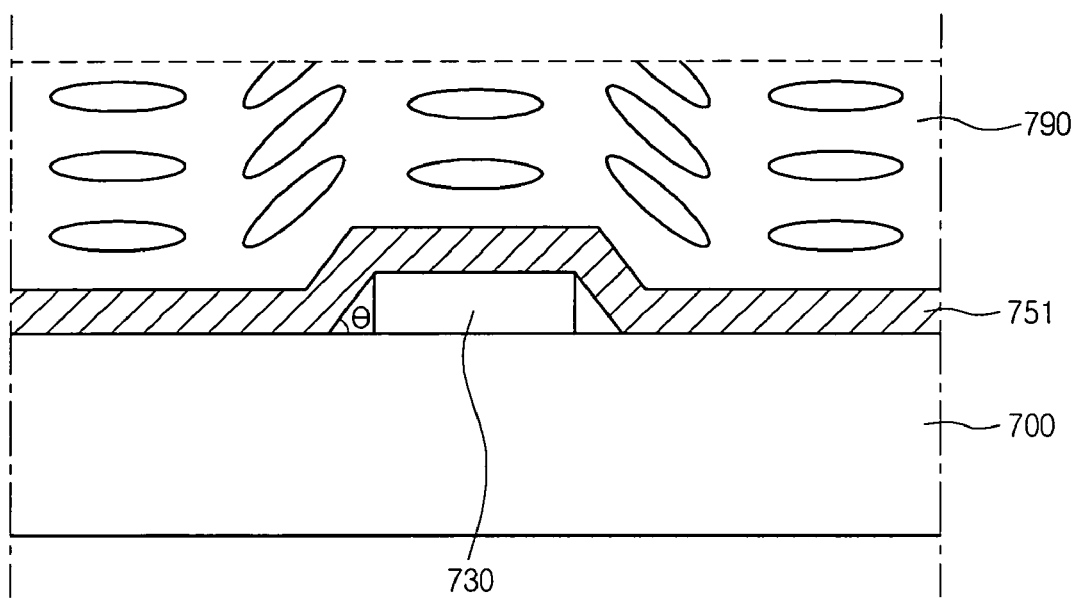
FIGS. 9A and 9B are sectional views schematically illustrating an alignment of liquid crystal in a region around a taper portion in an IPS mode LCD according to an embodiment of the present invention.
Figure 9B:
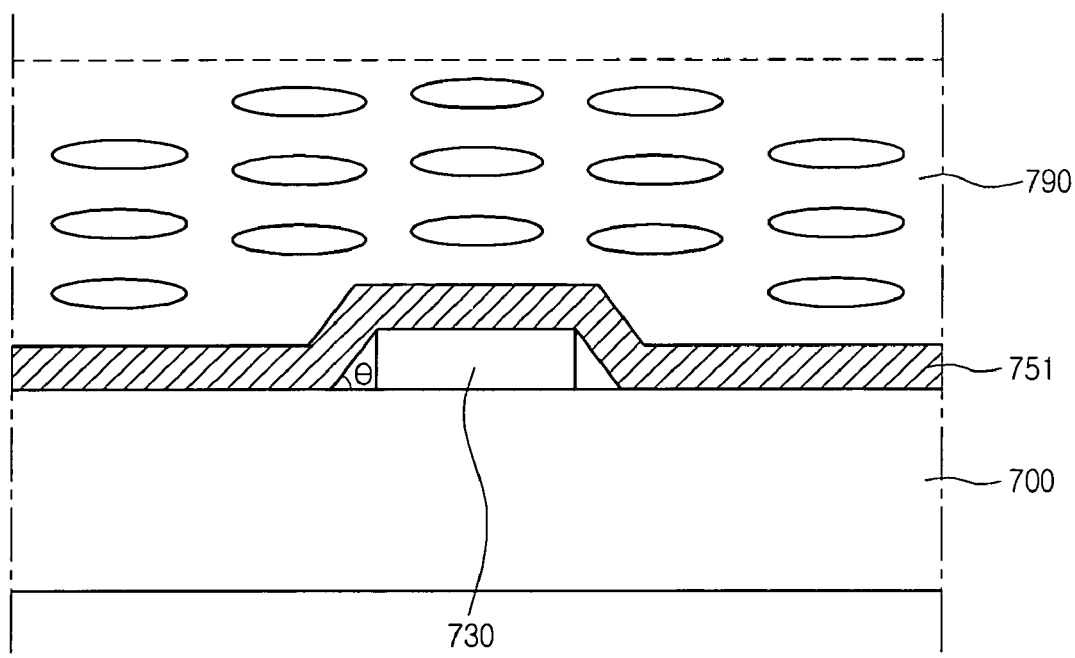

FIGS. 9A and 9B are sectional views schematically illustrating an alignment of liquid crystal in a region around a taper portion in an IPS mode LCD according to an embodiment of the present invention.

In the IPS mode LCD, in order to improve a profile of a line, an electrode or a line is formed to have sidewalls with a taper angle θ.

In FIGS. 9A and 9B, an alignment layer 751 is formed on a substrate 700 including an electrode 730 or a line formed thereon. The electrode 730 or the line has sidewalls with a taper angle θ.

Here, the taper angle θ is about 50° or greater.

When the taper angle θ is about 50° or greater and the alignment layer is rubbed, there a non-uniform alignment of liquid crystal 790 occurs around the electrode 730 or the line.

In FIG. 9A, the alignment layer 751 formed on the substrate 700 is primarily aligned using a rubbing process.

In the primary alignment process, the alignment layer 751 is rubbed in one direction using a rubbing roller having a rubbing cloth (such as velvet, rayon or nylon) wound therearound, to thereby form an alignment direction.

When the alignment layer 751 is rubbed using a rubbing roller having the rubbing cloth, there a non-uniform alignment of liquid crystal may occur in a region around the tapered sidewalls of the electrode or the line because the rubbing cloth is disheveled or cannot reach the alignment layer 751 due to the tapered sidewalls.

In FIG. 9B, the primarily-aligned alignment layer 751 is secondarily aligned by an irradiation of light or ion beams.

The second alignment process causes a uniform alignment in a region around the tapered sidewalls of the electrode 730 or the line.

Meanwhile, the primary alignment process may be performed through the irradiation of light or ion beams, and the secondary alignment process may be performed through the rubbing process.

Also, the primary and secondary alignment processes may be simultaneously performed.

The rubbing direction maybe identical to the light alignment direction. When the rubbing direction is identical to the light alignment, improvement effect is maximized.

Also, when the taper angle θ is smaller than about 50°, the primary and secondary alignment processes may be performed to further improve the alignment state of liquid crystal in a region around the tapered sidewalls of the electrode 730 or the line.

The IPS mode LCD according to the present invention can be manufactured through a patterning process using a printing method. However, the present invention is not limited to this method.

As described above, in the IPS mode LCD according to the present invention, the entire surface of the alignment layer is rubbed and then the entire rubbed surface or a region thereof around the stepped portion of the electrode is irradiated with light or ion beams. Accordingly, light leakage is prevented and a contrast ratio is improved. Consequently, high image quality is possible and product reliability can be improved.

Also, the rubbed alignment layer may be irradiated with a non-polarized light. Accordingly, a high image quality can be obtained without using a separate polarization device. Consequently, a manufacturing process for the IPS mode LCD can be simplified and a manufacturing costs can be reduced.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method for manufacturing an in-plane switching mode liquid crystal display device, comprising:
   providing first and second substrates that face each other;
   horizontally forming gate and common lines spaced apart from each other by a predetermined distance on the first substrate;
   forming a data line substantially perpendicular to the gate line;
   forming a plurality of common electrodes substantially parallel to the data line, and a plurality of pixel electrodes in an alternating patter with the common electrodes;
   forming a first alignment layer on the first substrate including the pixel electrodes;
   performing a primary alignment on the first alignment layer using a rubbing process;
   performing a secondary alignment on the whole rubbed first alignment layer by irradiating a light with a predetermined energy thereon, wherein at least one of the gate line, the data line, the pixel electrode, and the common electrode have a stepped portion with a step difference of about 0.1 µm or greater, and wherein the secondary alignment process is performed on at least a portion of the alignment layer around the stepped portion;
   forming a color filter layer and a black matrix layer on the second substrate; and
   forming a liquid crystal layer between the first and second substrates,
   wherein the light is one of a linearly polarized light, a partially polarized light, and a non-polarized light,
   wherein the light has a wavelength band of about 200~400 nm,
   wherein the predetermined energy is selected from about 0.01~0.10 J,
   wherein the light is irradiated in a slanted or vertical direction,
   wherein the first alignment layer is formed one of polyamic acid, polyethyleneimine, polyvinyl alcohol, polyethylene, polystyrene, polyphenylenephthalamide, polyester, polyurethanes and polymethylmethacrylate,
   wherein a rubbing direction of the primary alignment is identical to an alignment direction of the secondary alignment.

2. The method according to claim 1, further comprising prior to the forming of the liquid crystal layer:
   forming a second alignment layer on the second substrate;
   performing a primary alignment process on the second alignment layer using a rubbing process; and
   performing a secondary alignment process on the rubbed second alignment layer by irradiating a beam with a predetermined energy on an entire surface thereof.

3. The method according to claim 1, wherein the beam with the predetermined energy is irradiated on an entire surface of the rubbed first alignment layer.

4. A method for manufacturing an in-plane switching mode liquid crystal display device, comprising:
   providing first and second substrates that face each other;
   horizontally forming gate and common lines spaced apart from each other by a predetermined distance on the first substrate;
   forming a data line substantially perpendicular to the gate line;
   forming a plurality of common electrodes substantially parallel to the data line, and a plurality of pixel electrodes in an alternating pattern with the common electrodes;
   forming a first alignment layer on the first substrate including the pixel electrodes;
   performing a primary alignment on an entire surface of the first alignment layer using a rubbing process;
   performing a secondary alignment on the whole rubbed first alignment layer by irradiating a beam with a predetermined energy thereon, wherein at least one of the gate line, the data line, the pixel electrode, and the common electrode have a tapered sidewall with a taper angle of about 50° or greater, and wherein the first alignment layer being primarily aligned, at least a portion of the primarily-aligned first alignment layer around the tapered sidewall being secondarily aligned by irradiating a beam with a predetermined energy thereon;
   forming a color filter layer and a black matrix layer on the second substrate;
   and
   forming a liquid crystal layer between the first and second substrates,
   wherein the light has a wavelength band of about 200~400 nm,
   wherein the predetermined energy is selected from about 0.01~0.10 J,
   wherein a rubbing direction of the primary alignment is identical to an alignment direction of the secondary alignment.

* * * * *